United States Patent
Chen et al.

(10) Patent No.: US 9,839,895 B2
(45) Date of Patent: Dec. 12, 2017

(54) HIGH-GRAVITY ROTATING BED DEVICE HAVING NEW STRUCTURE AND APPLICATION THEREOF

(71) Applicant: BEIJING UNIVERSITY OF CHEMICAL TECHNOLOGY, Beijing (CN)

(72) Inventors: Jianfeng Chen, Beijing (CN); Guangwen Chu, Beijing (CN); Yong Luo, Beijing (CN); Haikui Zou, Beijing (CN)

(73) Assignee: BEIJING UNIVERSITY OF CHEMICAL TECHNOLOGY, Beijing (CN)

( * ) Notice: Subject to any disclaimer, the term of this patent is extended or adjusted under 35 U.S.C. 154(b) by 70 days.

(21) Appl. No.: 15/107,733

(22) PCT Filed: Dec. 24, 2014

(86) PCT No.: PCT/CN2014/094759
§ 371 (c)(1),
(2) Date: Jun. 23, 2016

(87) PCT Pub. No.: WO2015/096724
PCT Pub. Date: Jul. 2, 2015

(65) Prior Publication Data
US 2016/0317995 A1    Nov. 3, 2016

(30) Foreign Application Priority Data
Dec. 24, 2013  (CN) .......................... 2013 1 0721722

(51) Int. Cl.
*B01J 19/00* (2006.01)
*B01F 3/04* (2006.01)
(Continued)

(52) U.S. Cl.
CPC ...... *B01J 19/0066* (2013.01); *B01D 53/1468* (2013.01); *B01D 53/1481* (2013.01);
(Continued)

(58) Field of Classification Search
CPC ............ B01D 53/1468; B01D 53/1481; B01D 53/1493; B01D 53/185; B01F 3/04531;
(Continued)

(56) References Cited

U.S. PATENT DOCUMENTS 2,282,622 A * 5/1942 Torrence .................... A23L 2/76
239/214
2,537,833 A * 1/1951 Joos .......................... A61L 9/14
128/200.17
(Continued)

FOREIGN PATENT DOCUMENTS

CN    101549274    10/2009
CN    102247706    11/2011
(Continued)

OTHER PUBLICATIONS

International Search Report filed in PCT/CN2014/094759 dated Apr. 1, 2015.

*Primary Examiner* — Charles Bushey
(74) *Attorney, Agent, or Firm* — Rankin, Hill & Clark LLP

(57) ABSTRACT

A high-gravity rotating bed device, including a motor, a rotor and a housing. The rotor and the motor are entirely arranged within the housing. A load-bearing plate is provided within the housing. The load-bearing plate divides the housing into a reaction chamber and a balance chamber. The motor is arranged within the balance chamber. A transmission shaft of the motor passes through the load-bearing plate and is fixedly connected to the rotor arranged within the reaction chamber. A gas inlet, a gas outlet, a liquid inlet and
(Continued)

a liquid outlet are arranged on the housing. An externally communicating pipeline is arranged on the balance chamber. Also disclosed is an application of the present high-gravity rotating bed device under high-pressure conditions in operations such as mixing, transferring and reacting.

9 Claims, 3 Drawing Sheets

(51) Int. Cl.
| | | |
|---|---|---|
| *B01J 3/04* | (2006.01) | |
| *B01F 7/16* | (2006.01) | |
| *B01F 13/06* | (2006.01) | |
| *B01J 10/00* | (2006.01) | |
| *B01D 53/14* | (2006.01) | |
| *B01D 53/18* | (2006.01) | |
| *B01J 14/00* | (2006.01) | |
| *B01J 19/06* | (2006.01) | |
| *C08J 3/21* | (2006.01) | |
| *C10L 1/02* | (2006.01) | |
| *C10L 3/10* | (2006.01) | |
| *B01J 19/18* | (2006.01) | |

(52) U.S. Cl.
CPC ....... *B01D 53/1493* (2013.01); *B01D 53/185* (2013.01); *B01F 3/04531* (2013.01); *B01F 7/163* (2013.01); *B01F 13/065* (2013.01); *B01J 3/04* (2013.01); *B01J 10/00* (2013.01); *B01J 14/00* (2013.01); *B01J 19/06* (2013.01); *B01J 19/18* (2013.01); *C08J 3/21* (2013.01); *C10L 1/026* (2013.01); *C10L 3/103* (2013.01); *B01F 2003/04716* (2013.01); *B01F 2215/0468* (2013.01); *B01F 2215/0472* (2013.01); *B01F 2215/0481* (2013.01); *B01J 2219/00162* (2013.01); *B01J 2219/00189* (2013.01); *C08J 2375/04* (2013.01); *C10L 2200/0476* (2013.01); *C10L 2270/026* (2013.01); *C10L 2290/06* (2013.01); *C10L 2290/24* (2013.01)

(58) Field of Classification Search
CPC .................. B01F 7/163; B01F 13/065; B01F 2003/04716; B01F 2215/0468; B01F 2215/0472; B01F 2215/0481; B01J 3/04; B01J 10/00; B01J 14/00; B01J 19/0066; B01J 19/06; B01J 19/18; B01J 2219/00162; B01J 2219/00189; C08J 3/21; C08J 2375/04; C10L 1/026; C10L 3/103; C10L 2200/0476; C10L 2270/026; C10L 2290/06; C10L 2290/24
USPC ..................................... 261/84, 88
See application file for complete search history.

(56) References Cited

U.S. PATENT DOCUMENTS

| | | | | |
|---|---|---|---|---|
| 2,941,872 | A | * | 6/1960 | Pilo et al. ................. B04B 5/06 196/14.52 |
| 3,739,912 | A | * | 6/1973 | Miller, Jr. ............. B01F 3/0473 210/170.03 |
| 3,809,375 | A | | 5/1974 | Bonnet |
| 4,283,255 | A | * | 8/1981 | Ramshaw ................ B01D 3/30 159/6.1 |
| 4,382,900 | A | * | 5/1983 | Wem ........................ B01D 3/30 261/89 |
| 4,549,998 | A | * | 10/1985 | Porter ................ B01D 11/0453 261/88 |
| 4,594,081 | A | * | 6/1986 | Kroll .................... B01D 53/501 261/17 |
| 4,731,159 | A | * | 3/1988 | Porter ..................... B01D 1/30 159/13.1 |
| 5,363,909 | A | * | 11/1994 | Acharya .................. B01D 3/30 165/111 |

FOREIGN PATENT DOCUMENTS

| | | |
|---|---|---|
| CN | 102989379 | 3/2013 |
| CN | 103831075 | 6/2014 |

\* cited by examiner

HIGH-GRAVITY ROTATING BED DEVICE HAVING NEW STRUCTURE AND APPLICATION THEREOF

FIELD OF THE INVENTION

The invention relates to a high-gravity rotating bed device and application thereof, in particular to a motor built-in high-gravity rotating bed device and application thereof. The device can be applied to reinforcement of processes of mixing, transfer and reaction in a high-pressure environment, and belongs to the field of high gravity technology.

BACKGROUND OF THE INVENTION

In 1979, a British company named Imperial Chemical Industries (ICI) proposed a concept of high-gravity technology on the basis of an experimental result that a mass transfer process is hardly carried out under space microgravity, and invented a high-gravity rotating packed bed (RPB). Liquid infinitesimals are torn to be in a micron or nano scale in a high-gravity field, so that the mass transfer and mixing processes are greatly reinforced. In 1983, ICI applied the high-gravity rotating bed to the distillation process for the first time. In 1989, Beijing University of Chemical Technology performed the commercial operation of oil-field water injection and deoxygenation by utilizing the high-gravity rotating bed for the first time internationally; and in 1999, Dow Chemical applied the high-gravity rotating bed to production of HC10. After more than 30 years of development, the high-gravity technology has been expanded to various fields, is rapidly developed in research at home and abroad, and has been successfully applied to processes of oil-field water injection and deoxygenation, boiler water deoxygenation, preparation of nano powder, flue gas desulfurization, biological oxidation reaction, dust removal and the like. However, currently, the high-gravity rotating bed is mostly applied under the normal pressure, and application of the high-gravity rotating bed in a high-pressure system is hardly reported.

Most chemical processes need high-temperature and high-pressure mixing, transfer and reaction conditions, e.g., natural gas desulfurization, triethylene glycol dehydration, hydrogenated catalytic reaction, and pressure synthesis of perfumes, e.g., linalool, violet, nerolidol and the like. High-pressure reaction autoclaves with rotating parts, such as a stirred autoclave, have the greatest problem of sealing. In order to promote the progress of industries, related researchers invent a magnetic driving device. The magnetic driving device is applied to reaction equipment to fundamentally solve the problem of shaft seal leakage, which cannot be solved by a packing seal and a mechanical seal before, does not generate any leakage and pollution, and is the most ideal device for performing a chemical reaction at a high temperature and under a high pressure in China currently. Particularly, when the chemical reactions of inflammable, explosive and toxic media are performed, superiorities of the magnetic driving device are further shown.

However, when magnetic driving is applied to the high-gravity rotating bed, in the actual using process, magnetic driving will generate great heat, and the generated heat cannot be removed in a common cooling manner. Temperature raising of magnetic driving brings potential safety hazards on one hand, and will generate influence on a temperature of reactants inside a pressure vessel on the other hand so as to influence chemical processes of reaction, separation and the like.

SUMMARY OF THE INVENTION

The invention aims to solve the first technical problem of providing a high-gravity rotating bed device having a new structure. According to the device, after a motor is arranged in a housing, a sealing device between a rotor and a static housing of a conventional high-gravity rotating bed is omitted. The device is more compact in structure, is particularly applicable to mixing, transfer and reaction processes of a high-pressure system, enables the reaction process of the high-pressure system to be more stably carried out, and also effectively solves the problem of difficulty in sealing of the high-pressure system. The high pressure in the invention means a pressure over 0.1 MPa.

The invention aims to solve a second technical problem of providing application of the device in the operation processes of mixing, transfer, reaction and the like in a high-pressure environment.

In order to solve the first technical problem, the high-gravity rotating bed device having a new structure provided by the invention comprises a motor, a rotor and a housing;
    both the rotor and the motor are arranged in the housing;
    a bearing plate is arranged in the housing, and the bearing plate divides the housing into a reaction chamber and a balance chamber; and the bearing plate is used for bearing weights of the motor and the rotor.

The motor is arranged in the balance chamber, a transmission shaft of the motor passes through the bearing plate to be fixedly connected to the rotor arranged in the reaction chamber;
    a gas inlet, a gas outlet, a liquid inlet and a liquid outlet are formed on the housing; and
    a pipeline communicated with the outside is arranged on the balance chamber.

By arrangement of the two chambers, when rotor packing needs a high temperature and a high pressure, the two chambers also can reach pressure balance in short time, even though little leakage is generated between an output shaft of the motor and the bearing plate. As a result, tight sealing is not required and the problem of difficulty in sealing in the high-pressure process is solved.

It is more important that protective gas can be directly introduced into the balance chamber through the pipeline communicated with the outside, and a pressure of the protective gas is matched with a pressure in the reaction chamber, so that pressure stability in the reaction chamber is ensured, and stable material reaction is guaranteed.

Preferably, the reaction chamber is positioned above the bearing plate, and the balance chamber is positioned below the bearing plate; the gas inlet is formed on the side wall of the reaction chamber, the gas outlet extends out of the reaction chamber from the center of the rotor, and the liquid inlet is connected to a liquid distributor at the peripheral position of a hollow part of the rotor; and the liquid outlet extends out of the reaction chamber from an upper opening of the bearing plate.

More preferably, a pipeline is arranged at the lower end of the motor to be communicated with the reaction chamber, so that liquid leaked into a collection tank at the lower end of the motor is returned to the reaction chamber to be discharged.

Preferably, the reaction chamber is positioned below the bearing plate, and the balance chamber is positioned above the bearing plate; the gas inlet is formed on the side wall of the reaction chamber, the gas outlet extends out of the reaction chamber from the center of the rotor, and the liquid inlet is connected to a liquid distributor at the peripheral position of the hollow part of the rotor; and the liquid outlet is formed at the bottom of the reaction chamber.

Preferably, the motor is a shielding motor. Motors made of different materials can be selected according to the mixing, transfer and reaction processes of different media to be used as the shielding motor arranged in the housing. Members in the motor arranged in the housing cannot react with gas or liquid in the chambers.

The invention aims to solve the second technical problem of providing the application of the device in the operation processes of mixing, transfer, reaction and the like in the high-pressure environment. A rotating speed of the motor is preferably 20 to 3,000 rpm, an operation temperature in the chamber is preferably −40 to 400° C., and operation pressures in the chambers are preferably 0.05 to 50 MPa.

Preferably, when the material reaction is performed in the reaction chamber, the protective gas is introduced into the balance chamber by the external pipeline, so that the pressures in the reaction chamber and the balance chamber are balanced.

Preferably, the rotating speed of the motor is preferably 500 to 3,000 rpm, the operation temperature in the chamber is preferably 100 to 400° C., and the operation pressures in the chambers are preferably 1 to 50 MPa.

More preferably, the rotating speed of the motor is preferably 2,000 to 3,000 rpm, the operation temperature in the chamber is preferably 300 to 400° C., and the operation pressures in the chambers are preferably 20 to 50 MPa.

The invention has the following beneficial effects that:

according to the device provided by the invention, after the motor is arranged in the housing, the sealing device between the rotor and the static housing of the conventional high-gravity rotating bed is omitted; and the device is more compact in structure, is particularly applicable to the mixing, transfer and reaction processes of the high-pressure system, and effectively solves the problems of difficulty in reaction stability and difficulty in sealing of the high-pressure system.

wherein:

10—motor; 20—rotor; 30—housing; 31—bearing plate; 32—reaction chamber; 33—balance chamber; 331—pipeline communicated with outside; 34—gas inlet; 35—gas outlet; 36—liquid inlet; 361—liquid distributor; 37—liquid outlet; 13—steel cylinder; 141, 142, 143—valve; 151, 152, 153—flowmeter; 161, 162—pump; 171, 172, 173—storage tank.

DETAILED DESCRIPTION OF THE EMBODIMENTS

The implementation solution of the invention will be further illustrated below in conjunction with the accompanying drawings and embodiments. However, the invention is not limited to the listed embodiments.

Embodiment 1

Figure 1:
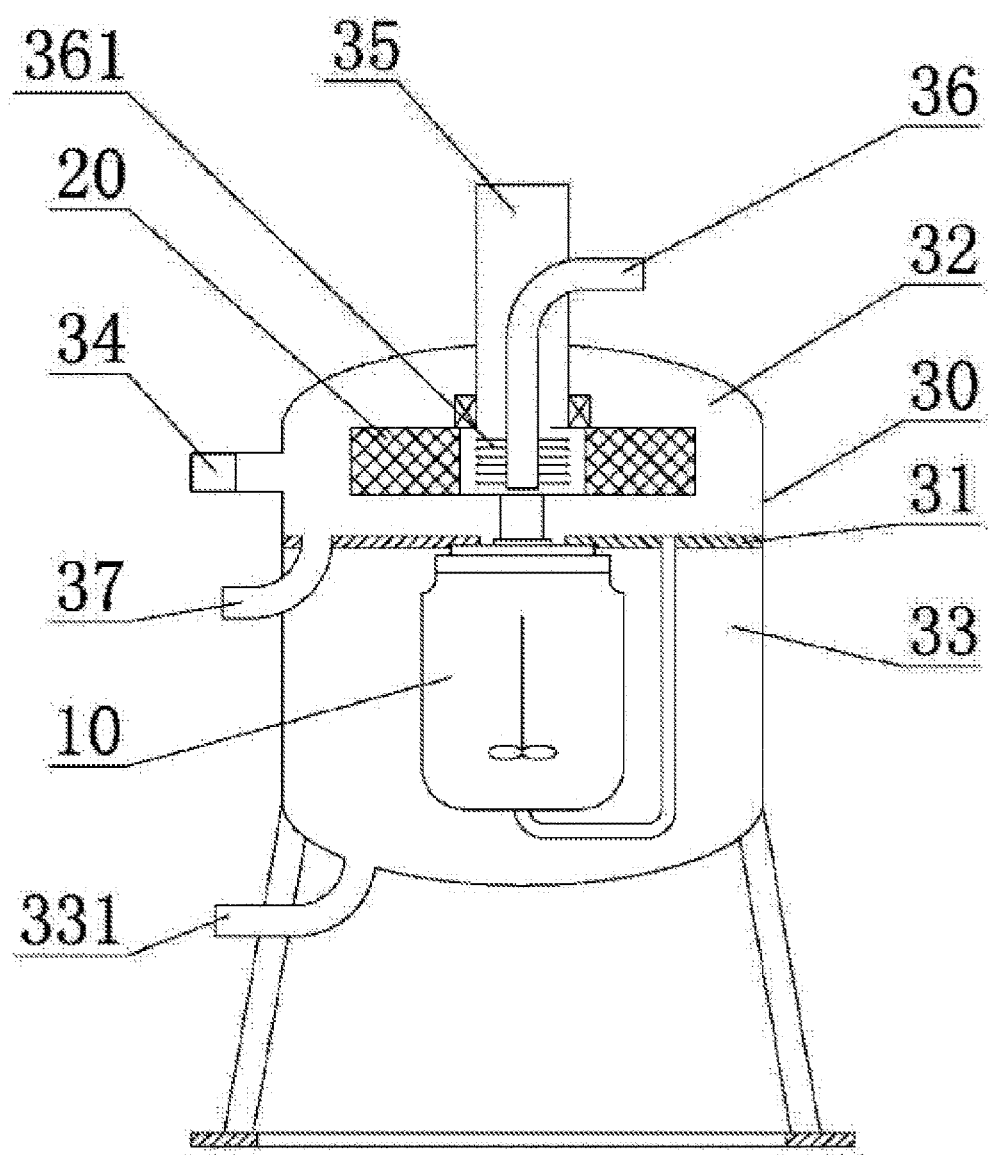
FIG. 1 is a structural schematic diagram of a high-gravity rotating bed device of embodiment 1 of the invention.

With reference to FIG. 1, a high-gravity rotating bed device having a new structure comprises a motor 10, a rotor 20 and a housing 30;

both the rotor 20 and the motor 10 are arranged in the housing 30;

the motor 10 is a shielding motor; motors made of different materials can be selected according to the mixing, transfer and reaction processes of different media to be used as the shielding motor arranged in the housing; members in the motor arranged in the housing cannot react with gas or liquid in chambers;

a bearing plate 31 is arranged in the housing 30, and the bearing plate 31 divides the housing 30 into a reaction chamber 32 and a balance chamber 33;

the motor 10 is arranged in the balance chamber 33 and is fixed on the bearing plate 31, and the weight of the motor 10 is borne by the bearing plate 31; a transmission shaft of the motor 10 passes through the center of the bearing plate 31 to be fixedly connected to the rotor 20 arranged in the reaction chamber 32;

a gas inlet 34, a gas outlet 35, a liquid inlet 36 and a liquid outlet 37 are formed on the housing 30;

the reaction chamber 32 is positioned above the bearing plate 31, and the balance chamber 33 is positioned below the bearing plate 31; the gas inlet 34 is formed on the side wall of the reaction chamber 32, the gas outlet 35 extends out of the reaction chamber 32 from the center of the rotor 20, and the liquid inlet 36 is connected to a liquid distributor 361 at the peripheral position of a hollow part of the rotor 20; the liquid outlet 37 extends out of the reaction chamber 32 from an upper opening of the bearing plate 31;

a pipeline 331 communicated with the outside is arranged on the balance chamber 33; and a pipeline is arranged at the lower end of the motor 10 to be communicated with the reaction chamber 32, so that liquid leaked into a collection tank (not shown in the figure) at the lower end of the motor 10 is returned to the reaction chamber 32 to be discharged.

By arrangement of the two chambers, when rotor packing needs a high temperature and a high pressure, the two chambers also can reach pressure balance in short time, even though little leakage is generated between an output shaft of the motor and the bearing plate, so that tight sealing is not required and the problem of difficulty in sealing in the high-pressure process is solved.

It is more important that protective gas (e.g., inert gas) can be directly introduced into the balance chamber 33 through the pipeline 331 communicated with the outside, and a pressure of the protective gas is matched with a pressure in the reaction chamber, thereby ensuring pressure stability in the reaction chamber and stable material reaction.

Application of the above device in the operation processes of mixing, transfer, reaction and the like in a high-pressure environment adopts the following parameter conditions: a rotating speed of the motor is preferably 20 to 3,000 rpm, an operation temperature in the reaction chamber is preferably −40 to 400° C., and operation pressures in the reaction chamber and in the balance chamber are the same, preferably 0.05 to 50 MPa.

According to a further improved embodiment, the rotating speed of the motor is preferably 500 to 3,000 rpm, the operation temperature in the reaction chamber is preferably 100 to 400° C., and the operation pressures in the reaction chamber and in the balance chamber are the same, preferably 1 to 50 MPa.

According to a much further improved embodiment, the rotating speed of the motor is preferably 2,000 to 3,000 rpm, the operation temperature in the chamber is preferably 300 to 400° C., and the operation pressures in the reaction chamber and in the balance chamber are the same, preferably 20 to 50 MPa.

Embodiment 2

Figure 2:
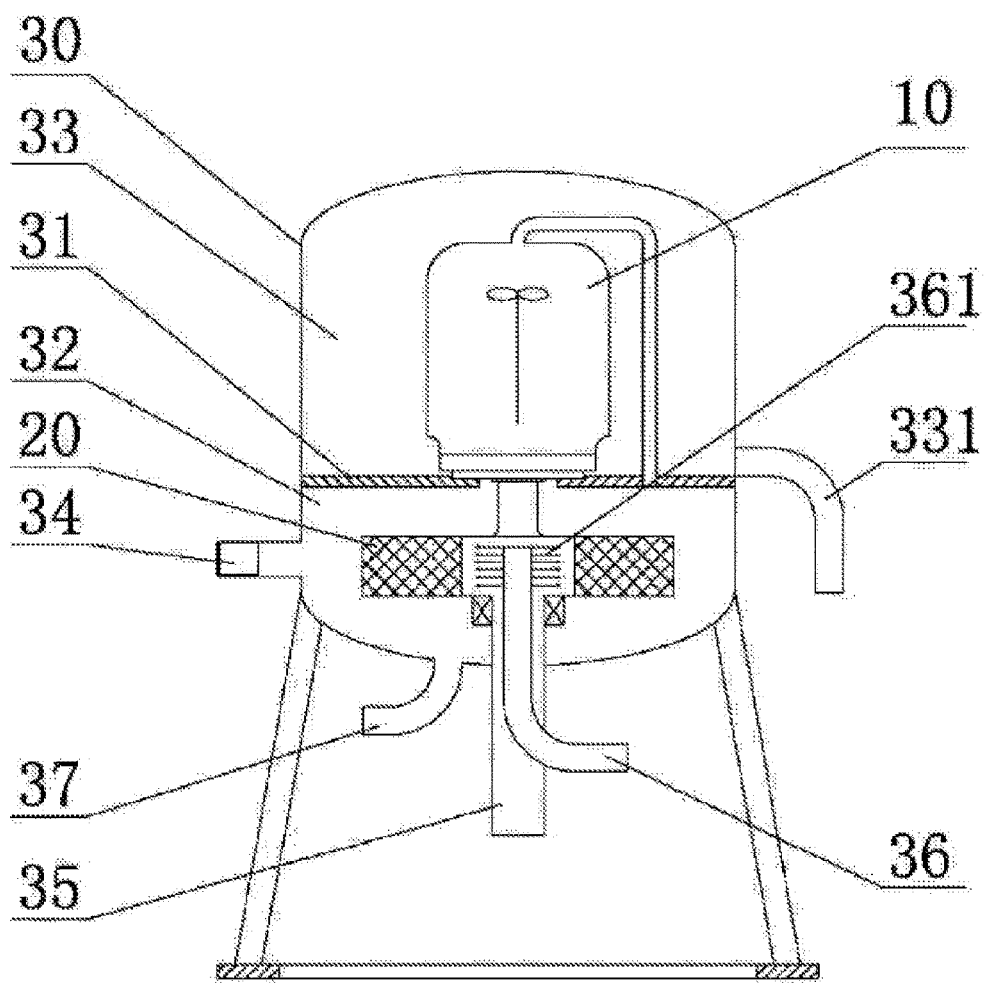
FIG. 2 is a structural schematic diagram of a high-gravity rotating bed device of embodiment 2 of the invention.

With reference to FIG. 2, a high-gravity rotating bed device having a new structure comprises a motor 10, a rotor 20 and a housing 30;

both the rotor 20 and the motor 10 are arranged in the housing 30;

the motor 10 is a shielding motor; motors made of different materials can be selected according to the mixing, transfer and reaction processes of different media to be used as the shielding motor arranged in the housing; members in the motor arranged in the housing cannot react with gas or liquid in chambers;

a bearing plate 31 is arranged in the housing 30, and the bearing plate 31 divides the housing 30 into a reaction chamber 32 and a balance chamber 33;

the motor 10 is arranged in the balance chamber 33 and is fixed on the bearing plate 31, and the weight of the motor 10 is borne by the bearing plate 31; a transmission shaft of the motor 10 passes through the center of the bearing plate 31 to be fixedly connected to the rotor 20 arranged in the reaction chamber 32;

a gas inlet 34, a gas outlet 35, a liquid inlet 36 and a liquid outlet 37 are formed on the housing 30;

the reaction chamber 32 is positioned below the bearing plate 31, and the balance chamber 33 is positioned above the bearing plate 31; the gas inlet 34 is formed on the side wall of the reaction chamber 32, the gas outlet 35 extends out of the reaction chamber 32 from the center of the rotor 20, and the liquid inlet 36 is connected to a liquid distributor 361 at the peripheral position of a hollow part of the rotor 20; the liquid outlet 37 is formed at the bottom of the reaction chamber 37; and a pipeline 331 communicated with the outside is arranged at the bottom of the balance chamber 33.

Application of the above device in the operation processes of mixing, transfer, reaction and the like in a high-pressure environment adopts the following parameter conditions: a rotating speed of the motor is preferably 20 to 3,000 rpm, an operation temperature in the reaction chamber is preferably −40 to 400° C., and operation pressures in the reaction chamber and in the balance chamber are the same, preferably 0.05 to 50 MPa.

According to a further improved embodiment, the rotating speed of the motor is preferably 500 to 3,000 rpm, the operation temperature in the reaction chamber is preferably 100 to 400° C., and the operation pressures in the reaction chamber and in the balance chamber are the same, preferably 1 to 50 MPa.

According to a much further improved embodiment, the rotating speed of the motor is preferably 2,000 to 3,000 rpm, the operation temperature in the chamber is preferably 300 to 400° C., and the operation pressures in the reaction chamber and in the balance chamber are the same, preferably 20 to 50 MPa.

Embodiment 3

Figure 3:
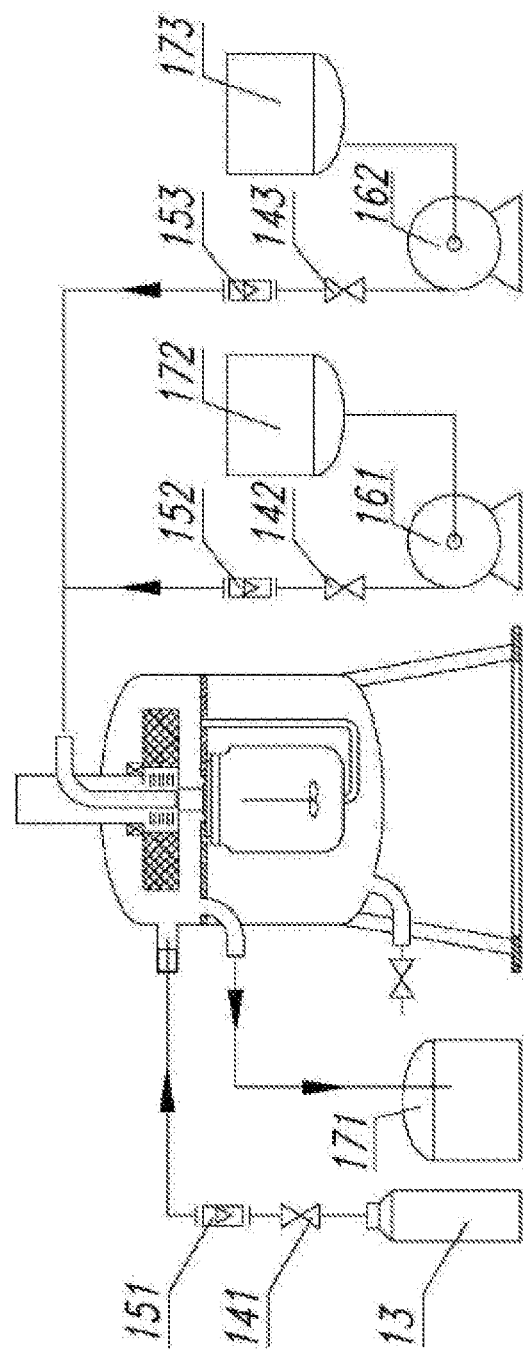
FIG. 3 is a flow schematic diagram of the mixing, transfer and reaction processes of the motor built-in high-gravity rotating bed device of the invention.

With reference to FIG. 3, mixing of suspension and latex under a high pressure in the preparation of a rubber composite material is taken as an example:

1), firstly, polyurethane latex is pumped into a reaction chamber by a pump, then suspension is pumped into the reaction chamber, with concentration of the suspension being 55% (on the basis of percentage by mass of suspended substances in the suspension); and 2), a rotating speed of a motor is regulated to 2,000 rpm, which results in that a flowing Reynolds number of the suspension is enabled not to be smaller than 1,000, finally nitrogen is introduced into the reaction chamber through a gas inlet, a system is pressurized to 20 MPa, latex with the suspension is obtained after a period of sufficient mixing, the latex with the suspension is conveyed to a next process, and finally, the rubber composite material is prepared.

Embodiment 4

With reference to FIG. 3, in the measurement of phase equilibrium data of a biodiesel preparation system, mixing of raw materials methanol and soybean oil is taken as an example:

different initial alcohol-to-oil molar ratios are adopted to measure liquid-liquid phase equilibrium data of a methanol and soybean oil system at a high temperature and under a high pressure, firstly, a vacuum pump is started to vacuumize the system, and the methanol and the soybean oil at a certain molar ratio are added into the reaction chamber by a high-pressure pump; a rotating speed of a motor is regulated to 550 rpm to start to stir and a heating system is started; stirring is stopped when a temperature in a high-gravity rotating bed device is constant at 160° C. and the methanol and the soybean oil are uniformly mixed, standing is carried out for 4 h, at the moment, the pressure is 10.11 Mpa, and then upper layer equilibrium liquid and lower layer equilibrium liquid are respectively collected and are analyzed by gas chromatography.

Embodiment 5

With reference to FIG. 3, mass transfer of triethylene glycol dehydration is taken as an example:

1), natural gas with free liquid and solid impurities being removed is introduced into the reaction chamber by a gas inlet, wherein content of water vapor in the natural gas is 0.092%;

2), triethylene glycol with a pressure of 7.95 Mpa, a temperature of 42° C. and barren mass fraction of 98.5% is pumped into the reaction chamber by a pump in a storage tank, water vapor in the natural gas is adsorbed by the triethylene glycol, and a rotating speed is regulated to 800 rpm; and 3), protective gas is introduced into a balance chamber of a high-gravity rotating bed device by an external pipeline, both pressures in the reaction chamber and in the balance chamber are guaranteed to be 7.95 Mpa, and after sufficient reaction, content of the water vapor at a gas outlet is 0.008696%.

Embodiment 6

With reference to FIG. 3, mass transfer of calcium chloride dehydration is taken as an example:

1), a desiccant calcium chloride is filled into the position of packing, and a temperature and a pressure of natural gas introduced into a housing are respectively 35° C. and 6.42 Mpa, wherein content of water vapor in the natural gas is 0.105%;

2), protective gas is introduced into a balance chamber of a high-gravity rotating bed device through an external pipeline, and both pressures in a reaction chamber and in the balance chamber are guaranteed to be 6.42 Mpa; and 3), a rotating speed is regulated to 1,050 rpm, and after sufficient adsorption of calcium chloride, content of the water vapor at a gas outlet is 0.009787%.

Embodiment 7

With reference to FIG. 3, reaction of hydrogen sulfide in natural gas and diethanol amine is taken as an example:

1), the natural gas with a pressure of 1.85 Mpa and a temperature of 50° C. is introduced into a reaction chamber through the gas inlet, the natural contains 1,960 ppm of harmful gas hydrogen sulfide, and the diethanol amine is pumped into the reaction chamber by a pump in a storage tank to react with the hydrogen sulfide;

2), a rotating speed of a rotating bed is regulated to 600 rpm, the type of packing is SiC, and a specific surface area of the packing is 600 $m^2/m^3$;

3), protective gas is introduced into a balance chamber of a high-gravity rotating bed device through an external pipeline, and both pressures in the reaction chamber and in the balance chamber are guaranteed to be 1.85 Mpa; and 4), after sufficient reaction in the reaction chamber, content of the harmful gas hydrogen sulfide in gas at an outlet of the rotating bed is 20 ppm.

Embodiment 8

With reference to FIG. 3, reaction of sulfur dioxide in natural gas and ammonium sulfite solution is taken as an example:

1), the natural gas with a pressure of 1.5 Mpa and a temperature of 45° C. is introduced into a reaction chamber ghrough a gas inlet, the natural gas contains 2,185 ppm of harmful gas sulfur dioxide, and the ammonium sulfite solution is pumped into the reaction chamber by a pump in a storage tank to react with the sulfur dioxide;

2), a rotating speed of a rotating bed is regulated to 750 rpm, the type of packing is sintered ceramic, and a specific surface area of the packing is 850 $m^2/m^3$;

3), protective gas is introduced into a balance chamber of a high-gravity rotating bed device through an external pipeline, and both pressures in the reaction chamber and in the balance chamber are guaranteed to be 1.5 Mpa; and 4), after sufficient reaction in the reaction chamber, content of the harmful gas sulfur dioxide in gas at an outlet of the rotating bed is 53 ppm.

Obviously, the described embodiments of the invention are merely examples for clearly illustrating the invention, but not intended to limit embodiments of the invention. A person of ordinary skill in the art can make other different forms of variations or modifications based on the illustrations above. All embodiments cannot be exhausted herein. Any obvious variations or modifications derived from the technical solution of the invention shall fall within the scope of protection of the invention.

The invention claimed is:

1. A high-gravity rotating bed device having a new structure, comprising a motor, a rotor and a housing, wherein
   both the rotor and the motor are arranged in the housing;
   a bearing plate is arranged in the housing, and the bearing plate divides the housing into a reaction chamber and a balance chamber;
   the motor is arranged in the balance chamber, and a transmission shaft of the motor passes through the bearing plate to be fixedly connected to the rotor arranged in the reaction chamber;
   a gas inlet, a gas outlet, a liquid inlet and a liquid outlet are formed on the housing; and
   a pipeline communicated with the outside is arranged on the balance chamber.

2. The motor built-in high-gravity rotating bed device according to claim 1, wherein
   the reaction chamber is positioned above the bearing plate, and the balance chamber is positioned below the bearing plate; the gas inlet is formed on a side wall of the reaction chamber, the gas outlet extends out of the reaction chamber from a center of the rotor, and the liquid inlet is connected to a liquid distributor at a peripheral position of a hollow part of the rotor; and the liquid outlet extends out of the reaction chamber from an upper opening of the bearing plate.

3. The motor built-in high-gravity rotating bed device according to claim 2, wherein a pipeline is arranged at a lower end of the motor to be communicated with the reaction chamber.

4. The motor built-in high-gravity rotating bed device according to claim 1, wherein
   the reaction chamber is positioned below the bearing plate, and the balance chamber is positioned above the bearing plate; the gas inlet is formed on a side wall of the reaction chamber, the gas outlet extends out of the reaction chamber from a center of the rotor, and the liquid inlet is connected to the liquid distributor at the peripheral position of a hollow part of the rotor; and the liquid outlet is formed at a bottom of the reaction chamber.

5. The motor built-in high-gravity rotating bed device according to claim 1 wherein the motor is a shielding motor.

6. Application of the device according to claim 1 in operation processes of mixing, transfer and reaction in a high-pressure environment, wherein a rotating speed of the motor is 20 to 3,000 rpm, an operation temperature in the reaction chamber is 40 to 400° C., and an operation pressure in the reaction chamber is 0.05 to 50 MPa.

7. The application according to claim 6, wherein when material reaction is performed in the reaction chamber, protective gas is introduced into the balance chamber through an external pipeline, so that the pressures in the reaction chamber and the balance chamber are balanced.

8. The application according to claim 6, wherein the rotating speed of the motor is 500 to 3,000 rpm, the operation temperature in the chambers is 100 to 400° C., and the operation pressures in the chambers are 1 to 50 MPa.

9. The application according to claim 6, wherein the rotating speed of the motor is 2,000 to 3,000 rpm, the operation temperature in the chambers is 300 to 400° C., and the operation pressures in the chambers are 20 to 50 Mpa.

* * * * *